United States Patent
Leming et al.

(10) Patent No.: US 10,310,851 B2
(45) Date of Patent: Jun. 4, 2019

(54) AUTOMATED GENERATION OF SERVICE DEFINITIONS FOR MESSAGE QUEUE APPLICATION CLIENTS

(75) Inventors: Matthew W. Leming, Romsey (GB); Mark R. Phillips, Winchester (GB); Fenglian Xu, Chandlers Ford (GB)

(73) Assignee: International Business Machines Corporation, Armonk, NY (US)

( * ) Notice: Subject to any disclaimer, the term of this patent is extended or adjusted under 35 U.S.C. 154(b) by 472 days.

(21) Appl. No.: 13/172,708

(22) Filed: Jun. 29, 2011

(65) Prior Publication Data

US 2013/0007767 A1    Jan. 3, 2013

(51) Int. Cl.
*G06F 8/73*    (2018.01)

(52) U.S. Cl.
CPC .................................. *G06F 8/73* (2013.01)

(58) Field of Classification Search
USPC .......................................... 717/113; 719/314
See application file for complete search history.

(56) References Cited

U.S. PATENT DOCUMENTS

| | | | |
|---|---|---|---|
| 2002/0083210 A1* | 6/2002 | Harrison et al. | 709/310 |
| 2003/0005021 A1* | 1/2003 | Shah | G06F 11/3404 718/1 |
| 2003/0189603 A1* | 10/2003 | Goyal et al. | 345/863 |
| 2006/0053144 A1* | 3/2006 | Hite et al. | 707/102 |
| 2006/0085798 A1* | 4/2006 | Bendiksen et al. | 719/318 |
| 2006/0236306 A1* | 10/2006 | DeBruin et al. | 717/113 |
| 2009/0268632 A1* | 10/2009 | Pabari | H04L 41/142 370/252 |

* cited by examiner

*Primary Examiner* — Emerson C Puente
*Assistant Examiner* — Steven M Do
(74) *Attorney, Agent, or Firm* — Steven M. Greenberg, Esq.; Shutts & Bowen LLP

(57) ABSTRACT

A method, system, and computer program product for automatically generating service definitions for application clients of a message broker is provided. The method includes retrieving a trace of interactions between different application instances and corresponding message queues in a message brokering system. Thereafter, messages in the trace can be analyzed to identify the application instances and related message exchange data. Finally, a service definition document can be generated for each identified application instance using the related message exchange data to describe computational services provided by the identified application instance.

5 Claims, 3 Drawing Sheets

AUTOMATED GENERATION OF SERVICE DEFINITIONS FOR MESSAGE QUEUE APPLICATION CLIENTS

BACKGROUND OF THE INVENTION

Field of the Invention

The present invention relates to service definitions for Web services and more particularly to generating Web services definitions for application instances.

Description of the Related Art

Web services represent the leading edge of distributed computing and are viewed as the foundation for developing a truly universal model for supporting the rapid development of component-based applications over the World Wide Web. Web services are known in the art to include a stack of emerging standards that describe a service-oriented, component-based application architecture. Specifically, Web services are loosely coupled, reusable software components that semantically encapsulate discrete functionality and are distributed and programmatically accessible over standard Internet protocols.

Conceptually, Web services represent a model in which discrete tasks within processes are distributed widely throughout a value net. Notably, many industry experts consider the service-oriented Web services initiative to be the next evolutionary phase of the Internet. Typically, Web services can be defined by an interface such as the Web services definition language (WSDL), and can be implemented according to the interface, though the implementation details matter little so long as the implementation conforms to the Web services interface. Once a Web service has been implemented according to a corresponding interface, the implementation can be registered with a Web services registry, such as Universal Description, Discover and Integration (UDDI), as is well known in the art. Upon registration, the Web service can be accessed by a service requestor through the use of any supporting messaging protocol, including for example, the simple object access protocol (SOAP).

System administrators of enterprise networks generally desire both to view certain applications, including middleware, as service catalogues and also to manage the applications as services so as to better govern the life cycle of an application. In addition, system administrators prefer to reuse services like Web services by analogously invoking application endpoints. Generally, for the system administrator to govern the life cycle of an application and to reuse services, the application is most conveniently described as a Web service according to a WSDL document. But this is not the case for many applications; therefore, requiring a system administrator to provide all the necessary information in order to create a WSDL document using a text editor or tooling provided by another application. This requires the system administrator to have a superior understanding of the system.

In addition, manually creating a WSDL document for an existing application instance is both labor intensive and also impractical as there are often a large number of middleware applications running against different central applications in a production environment. In addition, the system administrator may not know all the applications running on the system or what many of the applications do.

BRIEF SUMMARY OF THE INVENTION

Embodiments of the present invention address deficiencies of the art in respect to generating service definitions for application instances and provide a novel and non-obvious method, system and computer program product for automatically generating service definitions for application clients of a message broker. In an embodiment of the invention, a method for automatically generating service definitions for application clients of a message broker is provided. The method includes retrieving a trace of interactions between different application instances and corresponding message queues in a message brokering system. Thereafter, messages in the trace can be analyzed to identify the application instances and related message exchange data. Finally, a service definition document can be generated for each identified application instance using the related message exchange data to describe computational services provided by the identified application instance.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for automatically generating service definitions for application clients of a message broker. In accordance with an embodiment of the invention, a middleware API trace of PCF messages in a message broker can be analyzed and information extracted from a trace to generate WSDL type service definitions for corresponding instances of application clients connected to the message broker. Specifically, each application instance connected to the message broker can be determined from one or more PCF messages in the trace from which information can be extracted and used to automatically generate a WSDL document for each application instance. In this way, an end user, such as a system administrator, can manage the different application instances as discoverable services like Web services to better manage application life-cycles and to reuse the application instances without having to manually create the WSDL document.

Figure 1:
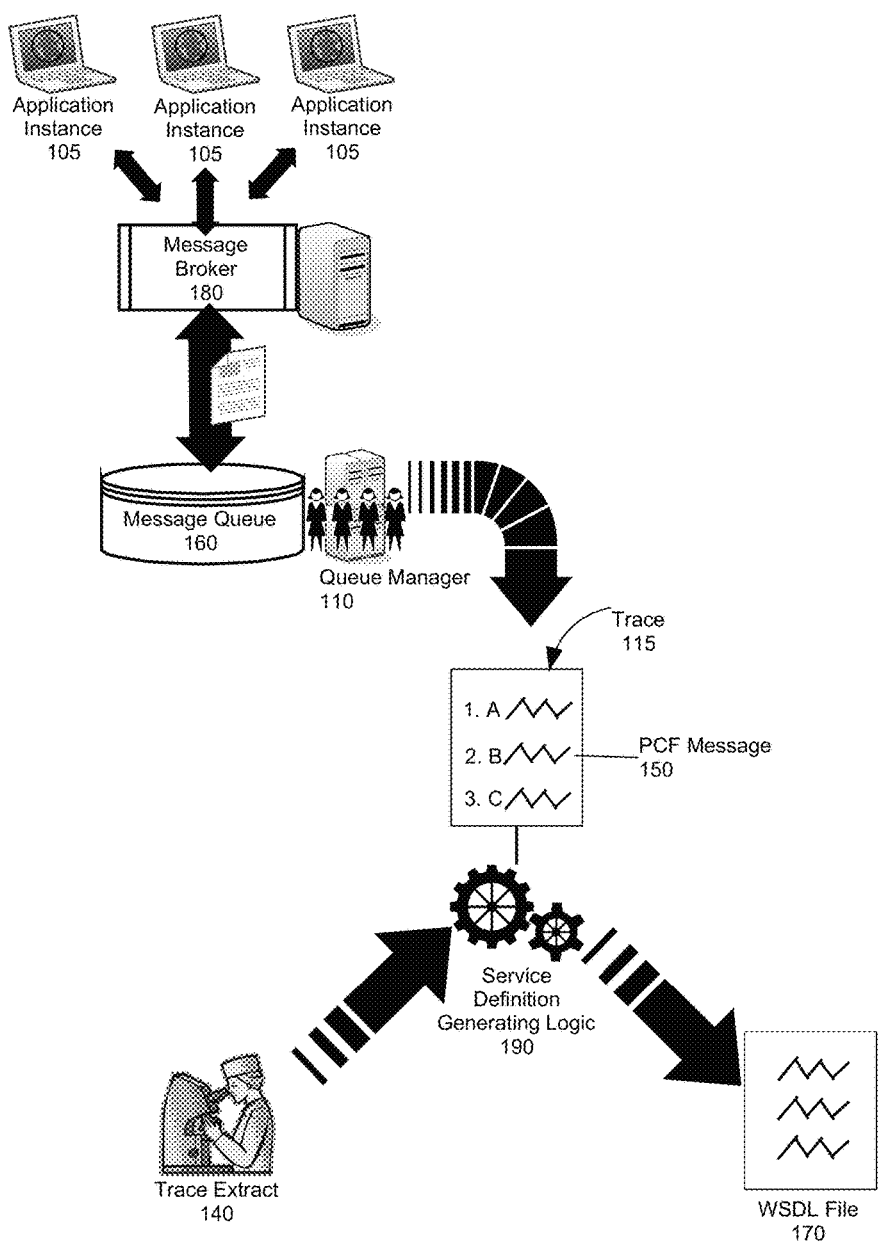
FIG. 1 is a pictorial illustration of a process for automatically generating service definitions for application clients of a message broker.

In further illustration, FIG. 1 pictorially shows a process for automatically generating service definitions for application instances coupled to a message broker. As shown in FIG. 1, an API trace 115 can be generated for different application instances 105 coupled to a queue manager 110 of a message broker 180. The queue manager 110 can manage one or more message queues 160 for the message broker 180. The message broker 180 in turn can manage the exchange of messages in the message queues 160 between subscribing ones of the application instances 105. Communication with the queue manager 110 can be achieved via local access by a process running on the same system as the queue manager 110 or via a network enabled interface to the queue manager 110, most typically using the transport control protocol (TCP).

The trace 115 can be in the form of programmable command format (PCF) messages 150 and upon generation can be stored for analysis. Of note, each PCF message 150 in the trace 115 represents a connection to the message broker 180, and for long running application instances, the application use time. More specifically, the use information that each PCF message 150 can include basic application instance information, application instance connection information, and a list of the API calls directed by the application instance, for instance opening a corresponding one of the message queues 160, getting and putting messages into a corresponding one of the message queues 160, and closing a corresponding one of the message queues 160.

Once the trace 115 has been generated, model document generating logic 190 can retrieve the trace 115 and can analyze the trace 115 to extract encapsulated information 140 in the PCF message 150 of the trace 115. The extracted information 140 can be used to identify the different application instance 105 subscribing to the message broker 180. In this regard, the extracted information 140 can include a name of each application instance 105, a type for each application instance 105, whether or not the application instance 105 consumes or provides data (or both), an identity of the queue manager 110 managing a corresponding one of the message queues 160 used by the application instance 105, a requested one of the message queues 160 to receive messages, an identity of the queue manager 110 corresponding to a specified destination of a message, a specification of a destination for a response to a message, and one or more message exchange patterns (MEP), such as one-way operation patterns or two-way operation patterns.

Figure 2:
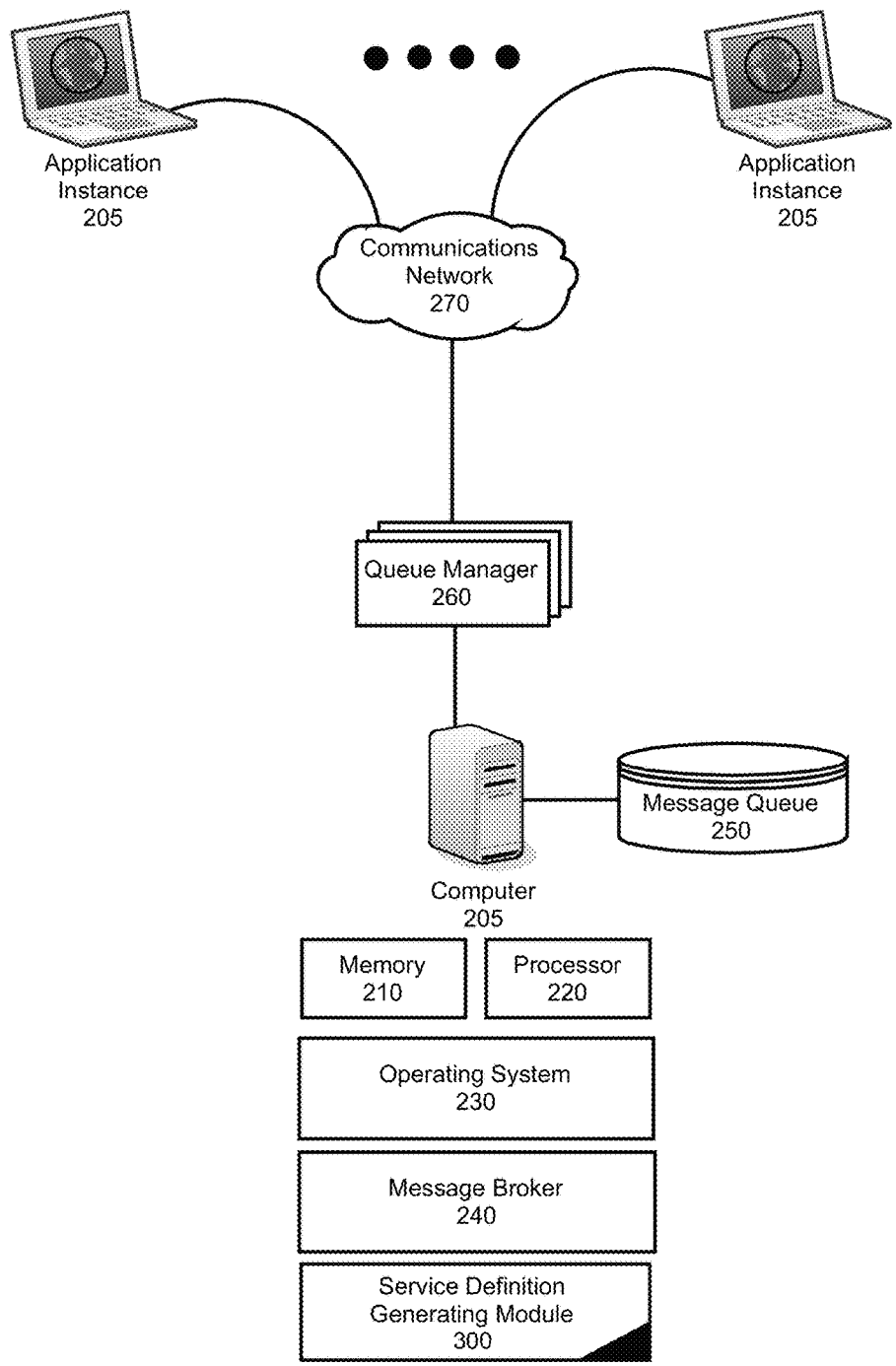
FIG. 2 is a schematic illustration of a message brokering system configured for automatically generating service definitions for application clients of a message broker; and, FIG. 3 is a flow chart illustrating a process for automatically generating service definitions for application clients of a message broker.

Using the extracted information 140, model document generating logic 190 can generate a WSDL document 170 for each unique application instance identified in the extracted information 140. Once the WSDL document 170 is published for each application instance 105, the application instance 105 can be discovered as a service from its run-time behavior. The process described in connection with FIG. 1 can be implemented in a message brokering data processing system. In further illustration, FIG. 2 schematically shows a message brokering data processing system configured for generating model documents for applications based upon the runtime activities of the applications. The system can include a computer 205 with at least one processor 220 and memory 210. The computer can be coupled to a message queue 260 and a queue manager 250. An operating system (O/S) 230 can execute in the memory 210 of the computer 205 and can host the execution of message broker 240 configured to handle messaging communications between application instances 105 over a computer communications network 270.

Of note, service definition generation module 300 can be coupled to the message broker 240. The service definition generation module 300 can include program code, which when executed by at least one processor 220 of the computer 205, can retrieve a trace from the message queue 260. The program code of the module 300 further can parse PCF messages in the trace to extract information such as a name of the application instance 205, a type of an application instance 205, a queue manager 250 for a corresponding message queue 260, a request destination, a qualified one of the queue managers 250 of the destination, a response destination, and an MEP. In addition, the program code of the module 300 can indicate a perceived accuracy of the extracted information in determining MEP, for instance by way of a confidence level.

Of note, the confidence level of a determined MEP can be computed according to a set of rules with weighting factors. For example, the following set of rules when applied individually to the extracted information of a PCF message for a referenced application instance can produce a confidence score for a determined MEP:

If all MQIs contains a set of pairs of messaging of operations (MOPs) in one connection: eg. MOP1 and MOP2

If MOP1.MQMD.msgType=MQMT_REQUEST (3)

If MOP1.ReplyToQ and Qmgr are specified and MOP2 uses that destination (5)

If MOP2.MQMD.msgType=MQMT_REPLY(3)

If MOP1.MQMD.ReportOption rules is COPY_MSG_ID_TO_CORRELID and MOP2.MQMD.CorrelId== MOP1.MQMD.MsgId(4)

MOPLMQMD.ReportOption rules is COPY_MSG_ID_TO_MSG_ID and MOP2.MQMD.MsgId== MOP1.MQMD.MsgId (4)

MOPLMQMD.Reportoption rules is PASS_CORRELID_TO_CORRELID and MOP2.MQMD.CorrelId== MOPLMQMD.CorrelId (4)

In this example, if the total scores sum to a large total, a higher confidence level will exist that the referenced application instance has an MEP of a 2-way operation. In contrast, if the total scores sum to a low total, a lower confidence level will exist and it can be concluded that the referenced application instance has an MEP of a 1-way operation.

Application instances 205 connected to the queue manager 250 can be identified based upon the parsed PCF messages. Of note, the program code of the module 300 can further include identify any duplicate applications and can merging any application instances identified as duplicates. Upon identifying each application instance 205, the program code of the module 300 can generate a service definition for each identified application instance 205. In this regard, the service definition can include WSDL statements based upon the information extracted from the PCF messages of the trace. For instance, the WSDL statements can include, but are not limited to an application service name, an application service type, for instance consumer, provider, or both, a queue manager, a request destination, the qualified queue manager of the destination, a response destination, and message exchange patterns.

Of note, MEP can be determined, in one instance, by reviewing set properties in the message descriptor and a message report option indicating how a pair of messages is correlated. In another instance, a set of rules with weighting factors can be used to determine the MEP. The weighting factors can express a level of confidence as to the determined MEP, which can then be used in a confirmation step. The confirmation step can require an end user to confirm the identified MEP for an identified MEP with a low confidence level. The specific confidence level indicated as a "low" confidence level is not defined, but in one instance for a specific set of rules, a total score of more than eight may indicate a high level of confidence to say that an application has a two-way operation, but a score of less than or equal to eight may indicate a one-way operation, but would require end user confirmation.

Figure 3:
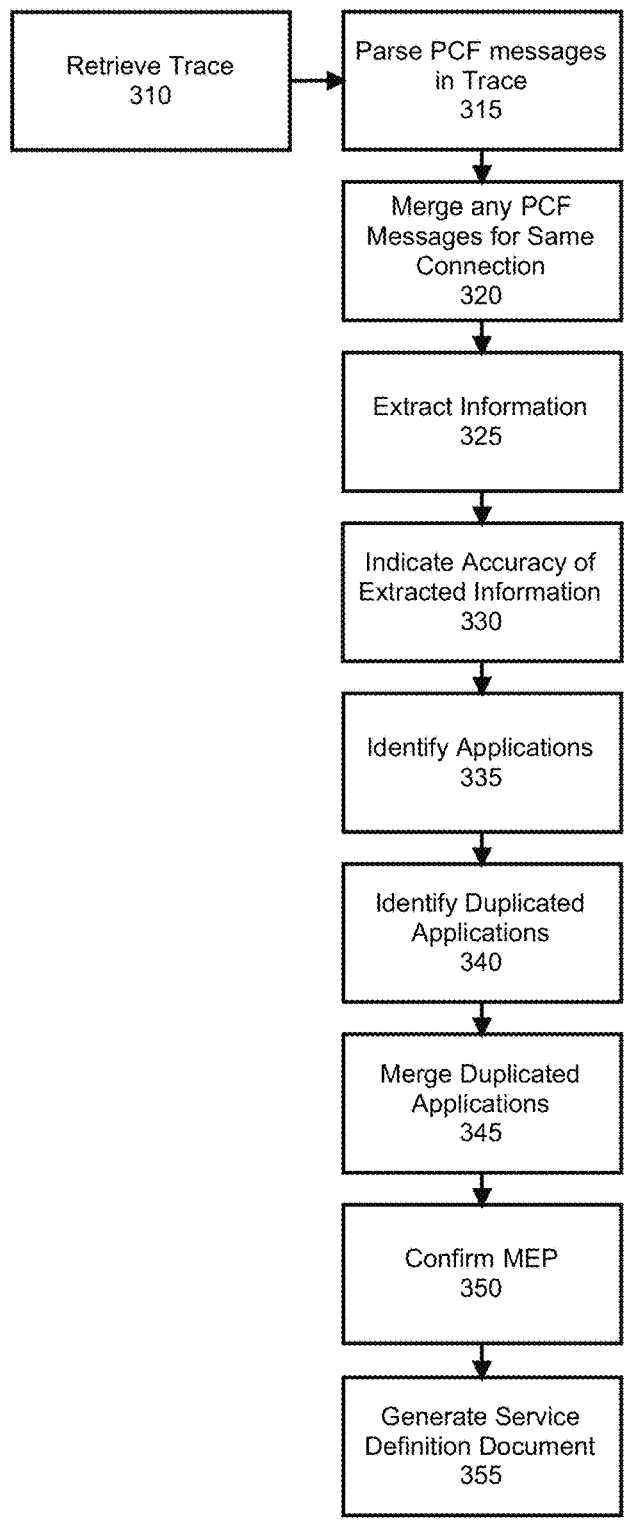

In even yet further illustration of the operation of the program code of the service definition generating module 300, FIG. 3 is a flow chart illustrating a process for generating service definitions automatically for application instances subscribing to a message queue in a message brokering system. Beginning in step 310, a trace can be retrieved from a database such as a message queue. The trace can be generated by a message brokering API for a plurality of applications interacting with one or more message queues of a corresponding message broker. Upon generation, the trace can be stored in a database for later analysis.

In step 315, PCF messages of the trace can be parsed, and any messages representing the same connection can be merged, as indicated in step 320. The parsed messages can then be analyzed to extract information, as shown in step 325. An accuracy indication of how accurate the extracted information is likely to be can also be included, as indicated in step 330. In step 335, duplicate references to the same application instance can be identified and merged, if required, as shown in steps 340 and 345, respectively. In this way, multiple instances of applications can be discovered simultaneously.

Optionally, for any application with a discovered MEP having a low confidence score, the discovered MEP can be confirmed by an end user, as in step 350. The MEP can be identified as a two-way operation pattern or a one-way operation pattern, in one instance by defining and using a set of rules with a confidence score for each rule in the set. The confidence score is designed to help an end user confirm or change the MEP determined. In other words, in one example, if a total score is more than eight for a specific set of rules, it can be concluded that there is a high level of confidence to indicate that an application indeed has a two-way operation pattern, but if the score is less than or equal to eight, it may indicate a one-way operation, but with this conclusion end user confirmation is desired. The end user can accept this conclusion or adjust the conclusion during confirmation. Of note, the set of rules and the corresponding confidence scores as well as the required levels, indicating high or low confidence, is not specifically define.

Finally, upon MEP confirmation, a service definition document can be generated for each identified application instance, as shown in step 355. The service definition document can contain an application service name, an application service type, a queue manager, a request destination, the qualified queue manager of the destination, a response destination, and MEP. In one aspect of the embodiment, the model document can be in WSDL format. In this way, the WSDL document can be generated automatically using information derived from the extraction of information from the trace in the message broker.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for automatically generating service definitions for application clients of a message broker comprising:
    retrieving a middleware application programming interface (API) trace of interactions between different application instances and corresponding message queues in a message brokering system each of the different application instances having a connection with a corresponding one of the message queues, the trace having a form of programmable command format (PCF) messages, each PCF message representing a connection to a message broker in the message brokering system and for long running applications, application use time;
    analyzing the PCF messages in the trace and merging any of the PCF messages in the trace representing a same connection between a same one of the different application instances and a corresponding one of the message queues and further merging any of the PCF messages in the trace representing a same one of the application instances so as to reduce the PCF messages in the trace to include PCF references for unique application instances, the merger of the PCF messages producing a reduced set of PCF messages from the trace, extracting information from the reduced set of the PCF messages and indicating an accuracy of the extracted information;
    identifying the application instances and related message exchange data;
    discovering a message exchange pattern (MEP) and determining a confidence score for the discovered MEP; and,
    on condition that the confidence score is determined to be low, identifying the MEP as a two-way operation pattern, but otherwise identifying the MEP as a one-way operation and generating a web services description language (WSDL) formatted service definition document for each identified application instance using the related message exchange data to describe in WSDL statements contained in the WSDL formatted service definition document, computational services provided by the identified application instance and to include the discovered MEP as identified.

2. The method of claim 1, wherein analyzing the PCF messages in the trace comprises:
    parsing the PCF messages of the reduced set in the trace to identify a set of referenced application instances;
    extracting related message exchange data for each of the unique application instances; and,
    associating a confidence level of accuracy for the related message exchange data.

3. A method for use in a computer system including a plurality of application instances and respectively corresponding message queues, the method comprising:
    retrieving a middleware application programming interface (API) trace of interactions between the plurality of application instances and their respectively corresponding message queues, with the API trace including a plurality of programmable command format (PCF) messages, each PCF message representing a connection to a message broker in the message brokering system and for long running applications, application use time;

analyzing, by machine logic, the plurality of PCF messages;

merging, by machine logic, the plurality of PCF messages into a plurality of merged PCF message, with each merged PCF message corresponding to the messages communicated by one application instance of the plurality of application instances and/or its respectively corresponding message queue;

extracting, by machine logic, extracted information from the plurality of merged PCF messages; and for each given application instance of the plurality of application instances, discovering a message exchange pattern (MEP) and determining a confidence score for the discovered MEP; and, on condition that the confidence score is determined to be low, identifying the MEP as a two-way operation pattern, but otherwise identifying the MEP as a one-way operation and generating, by machine logic, a web services description language (WSDL) formatted service definition document for the given application instance based, at least in part, upon the extracted information, with the service definition document for the given application instance including information indicative of computational services provided by the given application instance when the given application instance performs as an application client of a message broker and the discovered MEP as identified.

4. A computer program product for automatically generating model documents, the computer program product comprising:

a non-transitory computer readable storage medium having computer readable program code embodied therewith, the computer readable program code comprising:

computer readable program code for retrieving a middleware application programming interface (API) trace of interactions between different application instances and corresponding message queues in a message brokering system each of the different application instances having a connection with a corresponding one of the message queues, the trace having a form of programmable command format (PCF) messages, each PCF message representing a connection to a message broker in the message brokering system and for long running applications, application use time;

computer readable program code for analyzing the PCF messages in the trace and merging any of the PCF messages in the trace representing a same connection between a same one of the different application instances and a corresponding one of the message queues and further merging any of the PCF messages in the trace representing a same one of the application instances so as to reduce the PCF messages in the trace to include PCF references for unique application instances, the merger of the PCF messages producing a reduced set of PCF messages from the trace, extracting information from the reduced set of the PCF messages and indicating an accuracy of the extracted information identifying the application instances and related message exchange data;

computer readable program code for identifying the application instances and related message exchange data;

computer readable program code for discovering a message exchange pattern (MEP) and determining a confidence score for the discovered MEP; and, computer readable program code for, on condition that the confidence score is determined to be low, identifying the MEP as a two-way operation pattern, but otherwise identifying the MEP as a one-way operation and, computer readable program code for generating a web services description language (WSDL) formatted service definition document for each identified application instance using the related message exchange data to describe in WSDL statements contained in the WSDL formatted service definition document, computational services provided by the identified application instance and including the discovered MEP as identified.

5. The computer program product of claim 4, wherein the computer readable program code for analyzing the PCF messages in the trace comprises:

computer readable program code for parsing the PCF messages of the reduced set in the trace to identify a set of referenced application instances;

computer readable program code for extracting related message exchange data for each of the unique application instances; and, computer readable program code for associating a confidence level of accuracy for the related message exchange data.

* * * * *